United States Patent Office 3,277,997
Patented Oct. 11, 1966

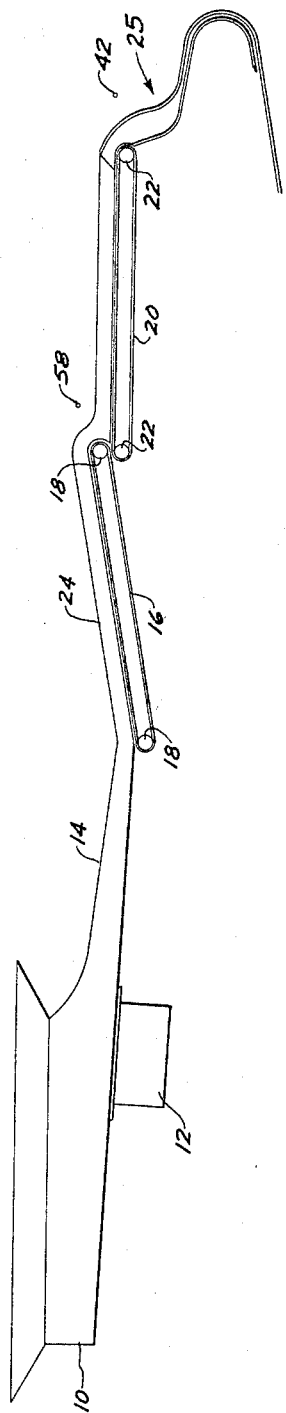

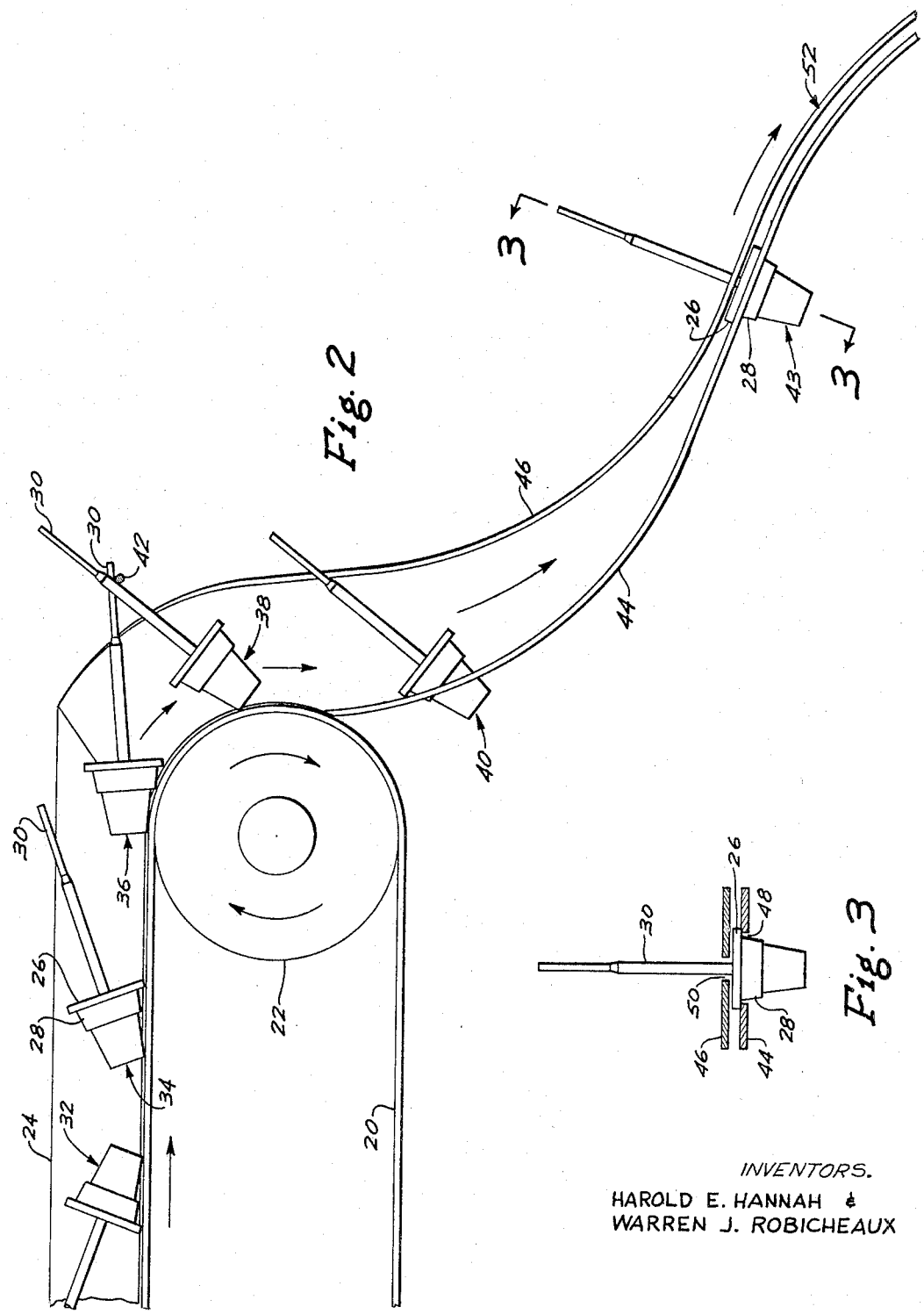

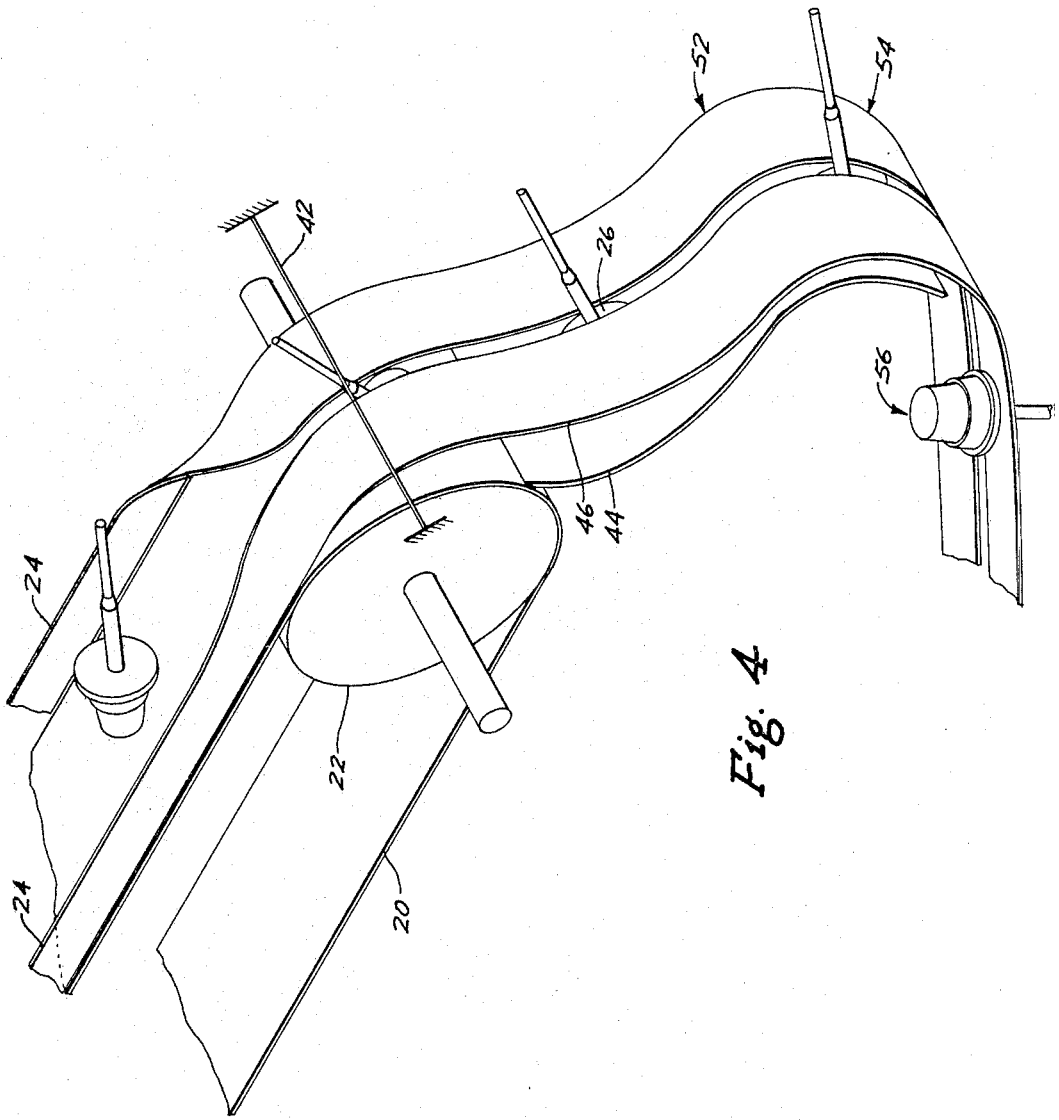

3,277,997
TRIPPER TYPE ORIENTER
Harold E. Hannah, Groves, and Warren J. Robicheaux,
Port Arthur, Tex., assignors to Gulf Oil Corporation,
Pittsburgh, Pa., a corporation of Pennsylvania
Filed Nov. 2, 1964, Ser. No. 408,206
6 Claims. (Cl. 198—33)

This invention relates to an apparatus for uniformly orienting a row of randomly oriented elongated articles.

The apparatus of this invention is adapted for orienting an unoriented alignment of moving articles, each article having an elongated configuration. The apparatus is particularly suited for orienting articles such as spray pumps prior to charging them to a capping machine. Spray pumps often have a configuration which includes a relatively broad flange with members projecting from the opposite faces thereof, one of said projecting members being an elongated member. The apparatus is adapted for orienting an alignment of any other articles having an elongated shaft, arm or rod.

The apparatus of this invention comprises a first conveyor means, which is a feed conveyor, and a second conveyor means, each having an article receiving end and an article discharge end. The first conveyor means is moveable and can comprise an endless moveable belt. The second conveyor means advantageously comprises a downwardly inclined stationary channel for the articles. The discharge end of the first conveyor means is elevated with respect to said second conveyor means so that articles discharged from the discharge end of the first conveyor means fall vertically into the downwardly inclined channel defined by said second conveyor means. An article orienting or tripping means, such as a wire, is disposed downstream from the discharge end of the first conveyor means and overhead with respect to the channel defined by the second conveyor means. The position of said tripping means is adapted for interception and reorientation of improperly oriented articles during the substantially free descent of those articles from the first conveyor means into the channel defined by the second conveyor means, while avoiding contact with properly oriented articles.

In an advantageous embodiment, the second conveyor means comprises track means inclined continuously downwardly from the discharge end of the first conveyor means. The track means comprises upper and lower tracks, each having longitudinal slot means. Said upper and lower tracks are disposed relatively remote from each other near the discharge end of the first conveyor means to permit substantially free descent of articles in this region and converge toward each other with increasing distance from the discharge end of the first conveyor means. The upper and lower tracks define a channel for the articles by encaging and guiding them after they have completed their free fall from the discharge end of the first conveyor means.

The article trip means is advantageously a wire disposed at about the same horizontal level as the discharge end of the first conveyor means but downstream from the discharge end of the first conveyor means. The article tripping means is disposed at a distance from the discharge end of the first conveyor means which is almost equal to the length of the elongated articles moving through the apparatus. The tripping means intercepts and reorients only those articles oriented in an improper direction upon reaching it and avoids interception of articles oriented in a proper or opposite direction. Because of the location of the tripping means, interception and reorientation occurs substantially only during descent of an article from the first conveyor means. The article tripping means substantially avoids contact with any article while it is moving on the first conveyor means or after it has completed its free fall to the second conveyor means.

An important advantage of the apparatus of this invention is that the article tripping means remains free of contact with the articles while they are traveling upon the feed conveyor. If improperly oriented articles were brought into contact with an orienting means, such as a trip wire, while being carried on a conveyor belt, slippage would be induced between the belt and the article while the latter is in contact with the orienting means. The result would be that the horizontal movement of the improperly oriented articles would be retarded. On the other hand, since oppositely oriented articles would not come into contact with the orienting means, no slippage would be induced between those articles and the conveyor. Such an article orienting means, by contacting only certain articles during movement along a conveyor belt, without contacting others, would induce a disruption of an established article spacing arrangement. In contrast, the apparatus of this invention reorients improperly oriented articles while substantially avoiding disruption of preestablished spacing between adjacent articles.

In the apparatus of this invention, an article can only contact the article orienting means during vertical fall from one conveyor to another. Since the article is falling through a nearly completely vertical path during its contact with the article orienting means, the duration of contact between the article and the tripping means is drastically reduced, as compared with the duration of contact when utilizing an article orienting means which contacts an article during horizontal movement. Therefore, the article orienting apparatus of this invention exerts a minimal effect upon horizontal spacing of adjacent articles.

There is still another advantage obtained with the article orienting apparatus of this inveniton. If a trip wire were disposed at an intermediate position along the length of the feed conveyor, it would have to be at a sufficiently high level above the surface of the conveyor to permit clearance of all portions of properly oriented articles. The requirement for clearance would often result in the failure of improperly oriented articles to contact the trip wire. However, since the trip wire of this invention is disposed beyond the discharge end of the feed conveyor, rather than at an intermediate position along the length thereof, it can be disposed at a sufficiently low level to insure contact with every improperly oriented article.

These and other advantages of the invention will be more clearly understood by reference to the accompanying drawings in which FIGURE 1 is a schematic side view of a conveyor system which includes the article orienting apparatus of this invention, FIGURE 2 is an enlarged side view of the article orienting apparatus, FIGURE 3 is a view taken through the section 3—3 of FIGURE 2, and FIGURE 4 is a perspective view of the article orienting apparatus of this invention.

A side view of a conveyor system incorporating the article aligning apparatus of this inveniton is shown in FIGURE 1. Vibratory hopper 10 having vibrator 12 attached thereto contains unaligned articles and feeds these articles through outlet trough 14 to a first movable conveyor belt 16. Belt 16 is operated by a pair of pulleys 18 which are actuated by any suitable motor means. Conveyor belt 16 discharges onto movable conveyor belt 20. Conveyor belt 20 is operated by a pair of pulleys 22 which are actuated by any suitable motor means. A continuous guide means 24 extends lengthwise along each side of conveyors 16 and 20 to align articles and prevent them from falling from the sides of the conveyors. Articles discharging from conveyor 20 proceed to region 25 of the system. Region 25 constitutes an advantageous embodiment of the article orienting apparatus of this invention.

Region 25 of FIGURE 1 is shown in greater detail in FIGURES 2, 3 and 4. FIGURE 2 shows a plurality of articles being transported by movable conveyor belt 20. The widest portion of each article is an intermediate flange 26 with a relatively short and wide portion 28 protruding from one face of said flange and a relatively long and narrow arm or rod 30 protruding from the other face of said flange. The upper rims of spaced-apart guide means 24 are sufficiently close together that each arm 30 is pointed in either a rearwardly direction with respect to article movement, as shown at 32, or a forwardly direction with respect to article movement, as shown at 34. As each article approaches the forward limit of movement of conveyor belt 20 it falls substantially vertically from the conveyor belt. FIGURE 2 shows at 36, 38, 40 and 43 the sequential positions during vertical fall of an article whose extension arm 30 is forwardly directed.

A trip wire 42 is disposed beyond the downstream limit of conveyor belt 20 and extends transversely with respect to the direction of movement of the conveyor belt. Trip wire 42 is disposed approximately at or slightly above the upper horizontal level of conveyor belt 20. The position of wire 42 is adjustable vertically from a position below to a position above the upper horizontal level of conveyor belt 20, and is adjustable horizontally from a position close to the limit of horizontal movement of conveyor belt 20 to a position removed from conveyor belt 20 by a distance nearly equal to the length of each article. Therefore, any suitable means is provided for moving trip wire 42 either toward or away from conveyor belt 20 and either lower or higher than the horizontal upper level of belt 20.

As each article moves downstream upon conveyor belt 20 it remains out of contact with trip wire 42 as long as the article proceeds along a horizontal path. This is indicated at 34 in FIGURE 2. When the article is in the region of right-hand pulley 22, it commences a vertical fall. When extension rod 30 is forwardly directed, uninterrupted fall would cause the article to descend rod-first. However, as indicated at 36, extension rod 30 is initially prevented from falling by riding onto the upper side of trip wire 42. Trip wire 42 holds rod 30 in a relatively elevated position while continued movement of conveyor belt 20 causes barrel portion 28 of the article to fall first. The article now falls in the orientation indicated at 38. The orientation assumed by the article at 38 is maintained by the article during the remainder of its vertical fall, as indicated at 40 and 43.

During its vertical fall, each article is directed into a channel formed by a pair of converging tracks including a lower track 44 and an upper track 46. Tracks 44 and 46 are provided with respective central longitudinal slots extending along their entire lengths. As indicated in FIGURE 3, longitudinal slot 48 of lower track 44 is wider than longitudinal slot 50 of upper track 46. During the vertical fall of each article, barrel 28 is received by longitudinal slot 48, which is slightly wider than barrel 28 at its widest region but smaller than flange 26. Lower track 44 is inclined downwardly over its entire length so that after each article is received in slot 48 it slides downwardly through a zone wherein lower track 44 and upper track 46 converge toward each other. During its entire vertical fall, extension arm 30 of each article extends through longitudinal slot 50 of upper track 46. In the zone 52, tracks 44 and 46 are sufficiently close to each other to form a flange encaging channel with barrel 28 protruding through lower track 44 and arm 30 protruding through upper track 46. In the zone 52, tracks 44 and 46 extend parallel to each other with each track continuing its downwardly inclined path.

FIGURE 4 indicates sequential positions during article movement. Articles are shown sliding downwardly between tracks 44 and 46 with flange 26 encaged by the upper and lower tracks. Parallel tracks 44 and 46 follow a U-shaped path as indicated at 54 in FIGURE 4, at the completion of which bottom track 44 is no longer required to hold the article and is therefore terminated. At the terminus of U-bend 54, each article is in an inverted position, as indicated at 56. The radius of curvature of U-bend 54 is sufficiently great and tracks 44 and 46 are adequately spaced apart in the region of U-bend 54 that each article can freely traverse the channel of the U-bend without binding.

The apparatus has been described with special reference to articles which move along conveyor belt 20 with extension rod 30 directed forwardly, as indicated at 34 in FIGURE 2. When an article travels along conveyor belt 20 with rod 30 directed rearwardly, as indicated at 32 in FIGURE 2, upon reaching the discharge end of belt 20 the article falls barrel-first onto lower track 44, with rod 30 extended upwardly through slot 50 of upper track 46. However, rod 30 does not come into contact with, and is not effected by, trip wire 42. Each article having a rearwardly extending rod 30, after falling clear of the discharge end of belt 20 and below the region of trip wire 42, is oriented in the general position indicated at 40. Although the articles are randomly oriented during travel upon belt 20, all articles are oriented in a common direction after falling clear of belt 20. The apparatus of this invention thereby accomplishes its article orientation function in a zone exterior to belt 20.

It is an important advantage of this invention that each article remains free of contact with any article orientation means while it is traveling upon conveyor belt 20. This permits uniform or preestablished spacing between adjacent articles to be maintained during transit through the system. If improperly oriented articles were brought into contact with an orienting means, such as a wire, while being carried horizontally upon belt 20, slippage would occur between the belt and the article while the latter is in contact with the orienting means. The result would be that the horizontal movement of certain articles would be retarded. On the other hand, since oppositely oriented articles would not come into contact with the article orienting means, their horizontal movement would progress uninterrupted. Therefore, any article orienting means which contacts only certain articles during horizontal movement upon a conveyor belt, without contacting others, induces a disruption of an established spacing arrangement.

Since the article orienting means of this invention does not contact any article during its horizontal travel upon the surface of the conveyor belt, it does not violate an established uniformity of spacing between adjacent articles. In the apparatus of this invention, the articles which come into contact with wire 42 do not contact said wire during their horizontal movement upon belt 20 where trip wire 42 would constitute obstruction against horizontal movement of the article and induce slippage between the article and belt 20. In contrast, the apparatus of this invention only permits contact between an article and wire 42 when the article is departing from belt 20 and while it is in the process of vertical fall. Since the article is moving primarily vertically rather than horizontally during its period of contact with wire 42, the effect of wire 42 upon horizontal spacing of the adjacent articles is minimal.

When an article is moving primarily vertically during its contact with wire 42, the duration of contact between the article and the trip wire 42 is reduced sharply as compared with the duration of contact when an article contacts wire 42 during horizontal movement. If a trip wire were disposed at an intermediate position along the length of a conveyor belt, each article extension rod 30 which contacted it would remain in contact with it until the wire had turned the rod through substantially a 180 degree arc. However, referring to FIGURE 2, it is seen that when an article extension rod contacts wire 42 while the article is in vertical fall, article reorientation is achieved with trip wire 42 only rotating the rod less than 90 degrees. Therefore, the disposition of trip wire 42 beyond the discharge end of belt 20 and in a region of vertical rather than horizontal article movement results in a substantial advantage in this regard. It is seen that the relative positioning of wire 42, conveyor belt 20, and converging tracks 44 and 46 represents substantial interdependence.

Since wire 42 is disposed beyond the discharge end of belt 20, rather than at an intermediate position along the length of belt 20, the wire can be disposed at a sufficiently low horizontal level to insure contact with every improperly oriented article. If a wire were disposed at an intermediate position along the length of the belt, it would have to be at a sufficiently high level above the belt to permit clearance of all portions of properly oriented articles. This requirement for clearance would render the wire ineffectual for the reorientation of any improperly oriented article whose extension rod happened to be pointed downwardly toward the conveyor belt, rather than upwardly.

An article moving along conveyor belt 20 with rod 30 pointed forwardly, as indicated at 34 in FIGURE 2, in the absence of wire 42 would fall rod-first from the discharge end of belt 20. Wire 42 reverses its orientation so that it falls barrel-first, as indicated at 38. Converging tracks 44 and 46 encage flange 26 of each article and transport it through a U-shaped path as indicated at 54 in FIGURE 4, thereby facilely inverting each article so that it is oriented rod-downward. The rod-downward orientation is advantageous for further handling of the article. For example, if the article is a spray pump, the rod-downward position is facile for feeding spray pumps to a capping machine.

In the system of FIGURE 1, two trip wires are utilized in series. Trip wire 58 is disposed beyond the frontmost extremity of conveyor belt 16 so that the foremost end of an elongated article can ride onto the upper surface of trip wire 58 concomitantly with the descent of the article from conveyor belt 16 to conveyor belt 20. Trip wire 58 is sufficiently in advance of the front end of conveyor belt 16 that it imparts little resistance against horizontal movement of the article upon conveyor belt 16. However, the efficiency of article orientation accomplished by trip wire 58 is not nearly as high as that accomplished by trip wire 42 because trip wire 58 is not utilized in combination with a pair of tracks 44 and 46. As the articles fall from conveyor belt 16 to conveyor belt 20, they are still slightly tilted in a direction tending to cause them to revert to their original, uncorrected orientation upon landing on conveyor belt 20. This direction of tilting is illustrated at position 40 in FIGURE 2. This disadvantageous tilting can be corrected if trip wire 58 is sufficiently low that the extension rod of an article continues to ride on it after the article lands upon conveyor belt 20. However, this arrangement permits trip wire 58 to interfere with the forward or horizontal motion of the article upon conveyor belt 20, thereby partially obviating the advantage of this invention. These difficulties are avoided by utilizing the trip wire in combination with the system of slotted tracks 44 and 46 shown in FIGURE 2, whereby the track system stabilizes the orientation correction imparted by the trip wire without permitting the trip wire to obstruct horizontal movement of the article.

Various changes and modifications can be made without departing from the spirit of this invention or the scope thereof as defined in the following claims.

We claim:

1. An apparatus for uniformly orienting randomly oriented elongated articles having a relatively broad flange with members projecting from both surfaces of said flange and one of said projecting members being an elongated member, comprising movable conveyor means having a discharge end, track means inclined continuously downwardly from the discharge end of said movable conveyor means, said track means comprising upper and lower tracks each having longitudinal slot means, said upper and lower tracks disposed relatively remote from each other near the discharge end of said movable conveyor means and converging toward each other with increasing distance from the discharge end of said movable conveyor means, said upper and lower tracks adapted to channel said articles as they fall from the discharge end of said movable conveyor means, article tripping means, said article tripping means disposed downstream from the discharge end of said movable conveyor means, said article tripping means disposed to intercept and reorient articles during descent between said upper and lower tracks substantially after said articles have completed movement upon said movable conveyor means.

2. The apparatus of claim 1 wherein said article tripping means is disposed at about the same level as said movable conveyor means.

3. The apparatus of claim 1 wherein said article tripping means is a wire.

4. The apparatus of claim 1 wherein said upper and lower tracks converge to form a spaced-apart channel for encaging the flange of each article during movement of the article therethrough.

5. The apparatus of claim 1 wherein said upper track and said lower track converge to form a spaced-apart channel which is downwardly inclined in the configuration of a U-bend.

6. An article orientation apparatus comprising movable conveyor means having a discharge end, track means inclined downwardly from the discharge end of said movable conveyor means, said track means adapted so that articles discharged from said movable conveyor means are channeled downwardly along said track means, article tripping means, said article tripping means disposed downstream from the discharge end of said conveyor means, said article tripping means disposed to intercept and reorient articles during descent along said track means and substantially after said articles have completed movement on said movable conveyor means, said track means comprising upper and lower tracks relatively widely spaced apart from each other in the region close to the discharge end of said movable conveyor means, said upper and lower track means converging toward each other with increasing distance from the discharge end of said movable conveyor means.

References Cited by the Examiner

UNITED STATES PATENTS 2,065,319 12/1936 Lewis _____ 221—130
2,962,851 12/1960 Hall.
3,106,281 10/1963 Mottin.

EVON C. BLUNK, *Primary Examiner.*

R. E. KRISHER, *Assistant Examiner.*